Jan. 7, 1969    R. A. PALMER    3,420,269
PROGRAM MEMBER OR THE LIKE AND METHOD OF MAKING THE SAME
Filed Nov. 8, 1966

INVENTOR
REED A. PALMER
BY
Cauda & Cauda
HIS ATTORNEYS

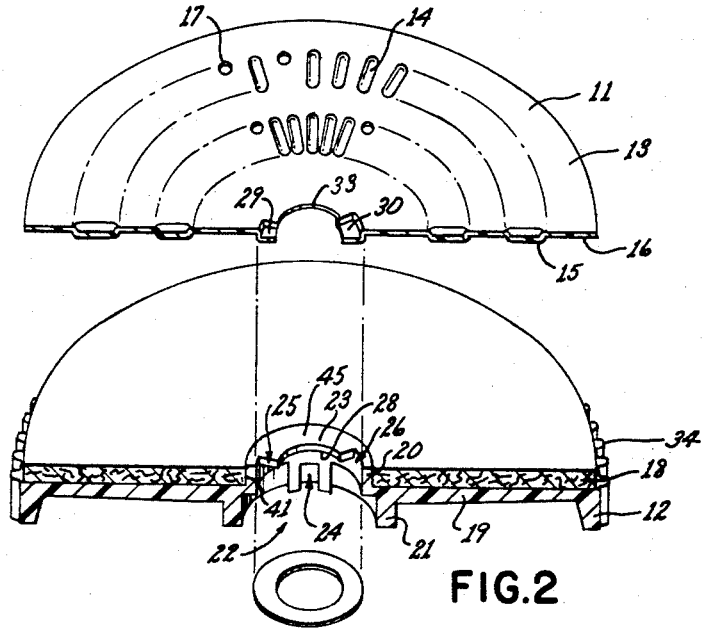
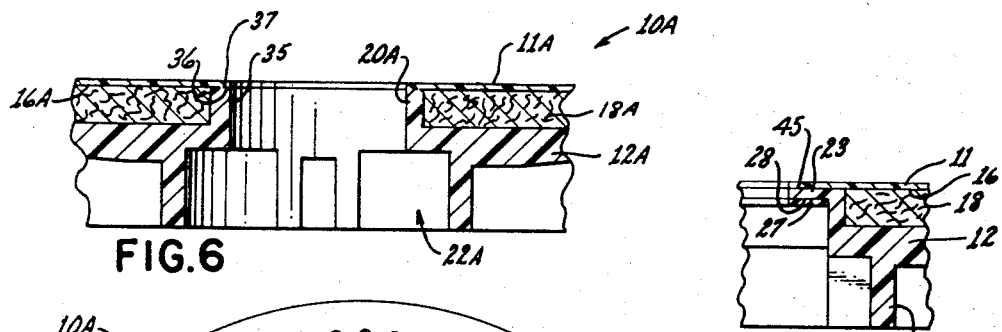
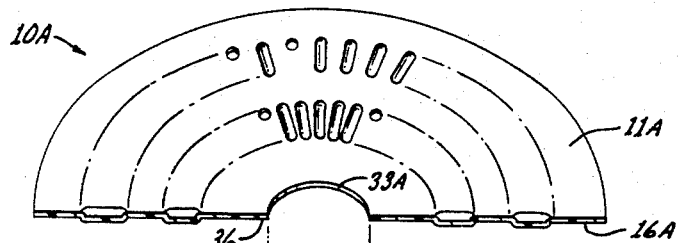
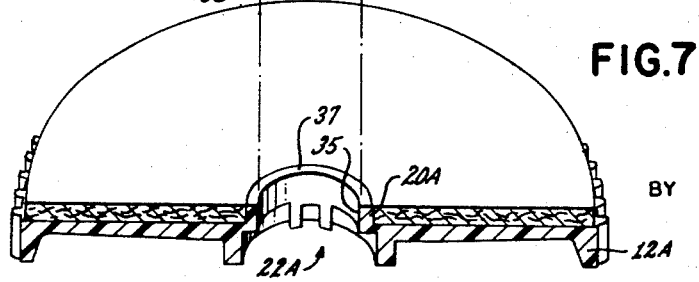

United States Patent Office 3,420,269
Patented Jan. 7, 1969

3,420,269
PROGRAM MEMBER OR THE LIKE AND
METHOD OF MAKING THE SAME
Reed A. Palmer, Greensburg, Pa., assignor to Robertshaw
Controls Company, Richmond, Va., a corporation of
Delaware
Filed Nov. 8, 1966, Ser. No. 592,871
U.S. Cl. 137—624.11                             6 Claims
Int. Cl. E03b; B21d 53/00

This invention relates to an improved program member or the like as well as to an improved method for making such a program member or the like.

Various program members, selector valves and the like have been provided in the past for selectively directing pneumatic flow between various ports interrupting a reading head surface wherein each program member or the like usually comprises a relatively flexible reading sheet having closed ended, channel-shaped blisters in one surface thereof so that as a particular channel of a blister bridges a pair of ports in the reading head, the channel means of the blister will fluidly interconnect together such ports. In order to move such reading sheet relative to the reading head, a rigid backing member is normally provided and is interconnected to the reading sheet in such a manner that the reading sheet and backing member will move in unison upon movement of either the reading sheet or backing member, the backing member normally being directly moved by manual or automatic means. In addition, the reading sheet normally has one or more aperture means passing completely therethrough so as to be aligned with a particular port means in the reading head whereby atmosphere or other fluid can flow through such aperture means and aligned port means to deactuate a pneumatically operated actuator or the like operatively connected to that particular port means in the reading head. Such fluid flow is normally filtered by a porous compressible material disposed between the reading sheet and the rigid backing member, such porous compressible material also serving the dual function of urging the reading sheet into sealing relation with the reading head surface so that the flexible reading sheet will substantially conform to the contour of such reading head surface for fluid sealing purposes as hereinafter described.

Accordingly, it is a feature of this invention to provide improved means for securing such reading sheet and rigid back-up means together to permit the same to move in unison for the above purposes.

In particular, one embodiment of this invention provides a unique arrangement wherein the flexible reading sheet is adapted to be ultrasonically welded to the rigid back-up means in such a manner that the flexible reading sheet and rigid back-up means can move in unison for the purposes previously described.

Another embodiment of this invention provides means wherein the rigid back-up means is secured to the flexible reading sheet in such a manner that a mechanical interlock is provided therebetween so that the flexible reading sheet and rigid back-up means move in unison.

Accordingly, it is an object of this invention to provide an improved program member or the like having one or more of the novel features set forth above or hereinafter shown or described.

Another object of this invention is to provide an improved method for making such a program member or the like.

Other objects, uses and advantages of this invention are apparent from a reading of this description, which proceeds with reference to the accompanying drawings forming a part thereof and wherein:

FIGURE 2 is an exploded perspective view partially in cross section of the parts of the program member of FIGURE 1.

FIGURE 5 is an enlarged, fragmentary, cross-sectional view taken on line 5—5 of FIGURE 3.

FIGURE 6 is a view similar to FIGURE 4 and illustrates another embodiment of the program member of this invention.

FIGURE 7 is a view similar to FIGURE 2 and illustrates the parts for forming the program member of FIGURE 6.

Figure 1:
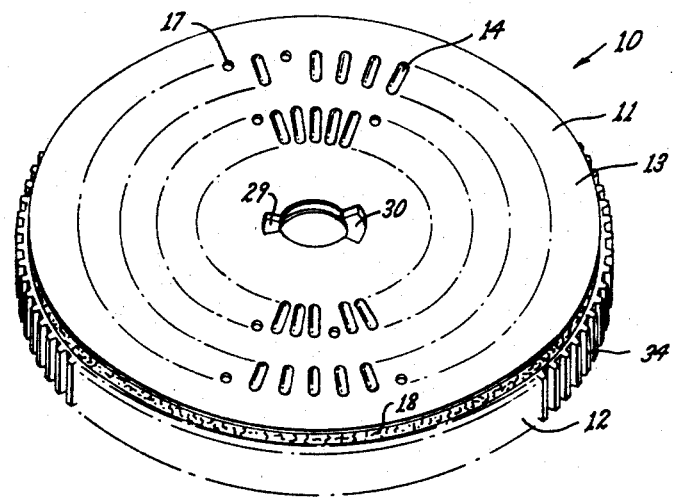
FIGURE 1 is a top perspective view of the reading side of one embodiment of the program member of this invention.

While the various features of this invention are hereinafter described and illustrated as being particularly adaptable for forming a rotatable program member or the like for controlling pneumatic flow, it is to be understood that the various features of this invention can be utilized singly or in any combination thereof to provide other types of program means as desired.

Therefore, this invention is not to be limited to only the embodiments illustrated in the drawings, because the drawings are merely utilized to illustrate some of the wide variety of uses of this invention.

Referring now to FIGURES 1 and 2, the improved program member or the like of this invention is generally indicated by the reference numeral 10 and comprises a flexible reading sheet 11 secured to a rigid back-up means 12 in a manner hereinafter described so that the back-up means 12 and reading sheet 11 will move in unison when either the reading sheet 11 or back-up means 12 is being moved.

The flexible reading sheet 11 can be formed of any suitable flexible material such as polyester, polyvinyl floride, or other stable film which is today commercially available. The reading side 13 of the flexible reading sheet 11 is inwardly embossed or otherwise provided with closed ended channels 14 that form raised blister-like shapes 15 on the other side 16 of the sheet 11, the blister means 15 being formed in predetermined patterns on the reading sheet 11 for suitable valving functions.

For example, should the program member 10 of this invention be formed to be utilized for controlling the operation of a plurality of pneumatically operated actuator means for an apparatus or the like so that the program member 10 will operate such pneumatically operated actuator means in a predetermined pattern or sequence, the blister means 15 are so constructed and arranged that when each blister means 15 has the channel 14 thereof bridging a particular pair of port means formed through a surface of a suitable reading head and against which the reading side 13 of the sheet 11 is being moved, the ports being bridged by the channel 14 of the particular blister 15 will be fluidly interconnected together so that if one of the port means being bridged is interconnected to a pneumatic source and the other bridged port means is interconnected to a pneumatically operated actuator means, the pneumatic source is effectively interconnected to such pneumatically operated actuator means to actuate the same until a non-channel portion of the reading surface 13 of the reading sheet 11 is brought into position to seal off the source port means from the port means leading to the pneumatically operated actuator means.

In order to effect rapid deactuation of such pneumatically operated actuator means, the reading sheet 11 can have a plurality of apertures 17 passing completely therethrough in a predetermined pattern so that when a particular aperture 17 is aligned with a port means in the reading head that leads to a previously actuated pneumatically operated actuator, fluid flow is adapted to pass between such actuator and the atmosphere through such aligned aperture 17 and port means in the reading head. For example, should the actuator be a vacuum operated actuator that had its chamber previously evacuated by a bridging channel means 14 in the manner previously described and subsequently have an aperture 17 aligned with the port means in the reading head leading to such previously actuated actuator, air is adapted to flow from the atmosphere through the aperture 17 and aligned port means in the reading head to the chamber of the actuator to deactuate the same.

In order to filter the flow of such air through the aperture 17 of the reading sheet 11, a porous compressible material or member 18 is disposed between the rigid back-up member or means 12 and the reading sheet 11 in the manner illustrated in FIGURES 1 and 2 whereby such porous compressible material 18 will filter such air flow from the atmosphere through the apertures 17.

In addition, the porous compressible material 18 has the further function of urging the reading sheet 11 into sealing relationship with the reading head surface when the rigid back-up means 12 is mounted adjacent the reading head in such a manner that the material 18 is placed under compression when the reading surface 13 of the reading sheet 11 is disposed against the reading head surface whereby the compressed material 18 causes the reading sheet 11 to conform to the contour of the reading head for the previously described fluid sealing of the port means in the reading head surface.

For further details of the operation and a particular use of such program member 10, reference is made to the United States Patent to Mansell, No. 3,123,976. However, this invention is not to be limited to any particular use of the program member thereof, as the features of this invention can be utilized for valving functions other than a program controlling means as described whereby the term "program member" is intended to be a broad term to indicate other types of manually or automatically controlled valving functions.

As previously stated, this invention provides improved means for causing the reading sheet 11 and rigid back-up means 12 to move in unison when the program member 10 is to be moved relative to the previously described reading head or the like for a program function, valving function, and the like.

Figure 4:
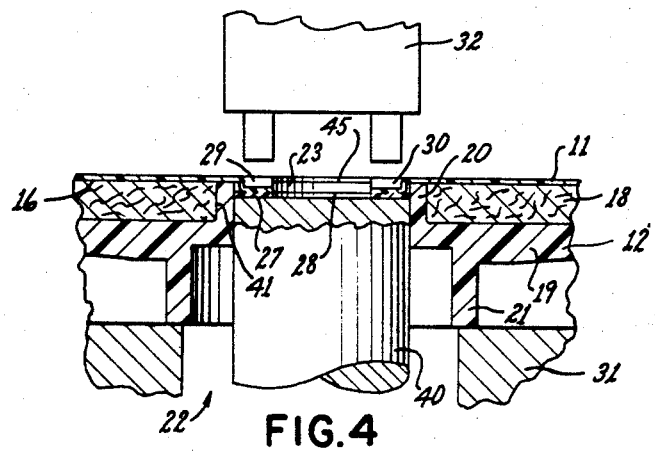
FIGURE 4 is an enlarged, fragmentary, cross-sectional view illustrating one of the steps in the method of this invention for making the program member of FIGURE 1.
Figure 3:
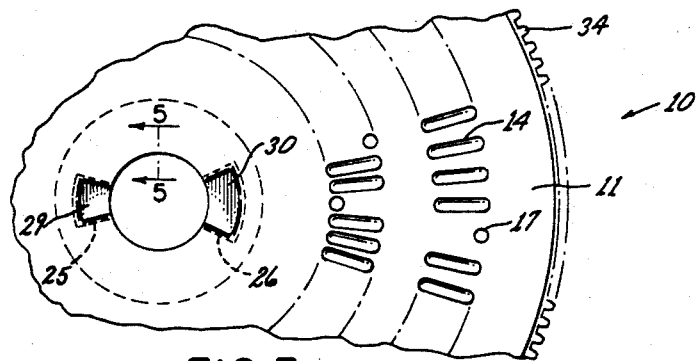
FIGURE 3 is a fragmentary, enlarged top view of the program member of FIGURE 1.

As illustrated in FIGURES 2 and 4, the rigid back-up means 12 includes a substantially flat plate portion 19 having projections 20 and 21 extending outwardly therefrom in opposite directions, the projections 20 and 21 and plate portion 19 having a bore means or aperture means 22 passing axially therethrough. The aperture means 22 passing through the rigid back-up means 12 defines an annular flange means 23 projecting radially inwardly about the aperture means 22 for a purpose hereinafter described. In addition, the aperture means 22 defines opposed key-way slot means 24 in the rigid back-up means 12 for a purpose hereinafter described.

The flange means 23 of the rigid back-up means 12 is interrupted by a pair of wedge-shaped and substantially truncated triangular slot means 25 and 26 passing therethrough in diametrically opposed relation with the slot means 25 being smaller than the slot means 26 for a purpose hereinafter described.

A separate washer-like element 27 is provided and is formed of a material that can be readily ultrasonically welded to the material forming the reading sheet 11. For example, when the reading sheet 11 is formed of the aforementioned plastic material, the element 27 can be formed of the same plastic material or other material that will readily permit the elements 27 and 11 to be ultrasonically welded together in a manner hereinafter set forth whereby the rigid back-up means can be formed of a material that is not compatible for ultrasonic welding to the reading sheet 11.

The washer-like element 27 is so constructed and arranged that the same is adapted to be disposed in the aperture means 22 of the rigid back-up member 12 against the under side 28 of the flange means 23 to have parts thereof fully exposed at the slot means 25 and 26 passing through the flange means 23 for a purpose hereinafter described.

The flexible reading sheet 11 is formed with a pair of outwardly projecting blister members 29 and 30 in substantially the same manner as the blister means 15 previously described, except that the blister means members 29 and 30 each has a wedge-shaped configuration substantially identical to the configurations of the respective slot means 25 and 26 in the flange means 23 of the rigid back-up means 12 so that the blister members 29 and 30 can be substantially snuggly received in the recess means 25 and 26 and have the flat tops thereof disposed against the exposed parts of the washer-like element 27 in the manner illustrated in FIGURE 4 while the non-reading side 16 of the reading sheet 11 is disposed flat against the side 45 of the flange means 23 in the manner illustrated in FIGURE 5.

In order to assemble and secure the parts 11, 18, 12 and 27 together to form the program member 10 of this invention, the rigid back-up means 12 can be suitably supported on fixed support means 31 in the manner illustrated in FIGURE 4 whereby the washer-like element 27 can be carried by a suitable plunger means 40 received upwardly into the aperture means 22 of the back-up means 12 to hold the washer-like element 27 against the underside 28 of the flange means 23 in the manner illustrated in FIGURE 4. Thereafter, or before, the porous compressible member 18 can be disposed on the plate-like portion 19 of the rigid back-up means 12 by having an opening 41 thereof telescopically receiving the projection 20 of the rigid back-up member 12 in the manner illustrated in FIGURES 2 and 4. Thereafter, the flexible reading sheet 11 can be disposed on top of the surface 45 of the flange means 23 and porous compressible member 18 in the manner illustrated in FIGURE 4, with the blister means 29 and 30 properly oriented with the respective slot means 25 and 26 so that the blister members 29 and 30 can be received therein and be disposed against the exposed parts of the washer-like element 27 as illustrated in FIGURE 4.

Therefore, it can be seen that by having the cooperating slot means 25 and blister member 29 of a different size than the cooperating slot means 26 and blister member 30, the reading sheet 11 can only be placed in a proper oriented assembled relationship with the rigid back-up means 12 so that the pattern of blister means 15 and apertures 17 on the reading sheet 11 will be properly oriented relative to the key-way slots 24 in the rigid back-up means 12 for a purpose hereinafter described.

After the elements 11, 18, 12 and 27 have been assembled in the manner illustrated in FIGURE 4, an ultrasonic welding head 32 is moved against the blister means members 29 and 30 to ultrasonically weld the blister members 29 and 30 directly to the exposed parts of the washer-like element 27 whereby the supporting plunger means 40 acts as an anvil for the vibrating welding head 32 in a manner well known in the art.

In this manner, it can be seen that the flange means 23 of the rigid back-up means 12 is completely trapped between the washer-like element 27 and the reading sheet 11 in the manner illustrated in FIGURE 5 whereby the reading sheet 11, porous compressible material 18, rigid back-up means 12 and washer-like element 27 are secured together in stacked relation solely by the ultrasonically welded together parts of the element 27 and blister members 29 and 30.

In addition, since the blister members 29 and 30 of the reading sheet 11 have a configuration substantially identical to the slot means 25 and 26 in the flange means 23 of the rigid back-up means 12, a mechanical interlock or splined relation is provided between the rigid back-up means 12 and the reading sheet 11 so that the same will turn or move in unison.

For example, the program member 10 of this invention can telescopically receive a control shaft (not shown) that projects through the aperture means 22 in the rigid back-up means 12 and through an aligned aperture 33 formed through the reading sheet 11 to rotatably mount the program member 10 to the previously described reading head or the like. Such shaft-like member can be provided with a transverse pin which is received in the opposed key-way slots 24 formed in the rigid back-up means 12 so that manual rotation of the shaft-like member will cause the program member 10 to rotate in union therewith relative to the reading head whereby the operator or the like can place the program member 10 in the desired position relative to the reading head for start of cycle, end of cycle or a particular valving function of the program member 10 as desired.

In this manner, a suitable control knob or the like can be positioned on such control shaft whereby the indications for the positioning of the program members 10 can be properly oriented with the key-way slots 24 in the rigid back-up means 12 whereby the blister means 15 and aperture means 17 of the reading sheet 11 are properly oriented with the key-way slots 24 by the cooperating blister members 29, 30 and recess means 25, 26 in the manner previously described.

In addition, the rigid back-up means 12 can be provided with a ring gear-like outer periphery 34 in the manner illustrated in FIGURES 1 and 2 so that the program member 10 can be rotated by a suitable timer motor about the shaft that rotatably mounts the program member 10 to the reading head in the manner previously described, the timer motor having its output shaft driving a pinion gear adapted to be disposed in meshing relation with the ring gear-like means 34 for such rotatable movement of the program member 10 relative to the reading head.

While the program member 10 previously described has the reading sheet 11 ultrasonically welded to a washer-like member 27 of the rigid back-up means 12 to interconnect the same together, the washer-like member 27 therefore being considered as part of the rigid back-up means 12, it is to be understood that the reading sheet 11 could be ultrasonically welded to other parts of the rigid back-up means 12, if desired.

For example, reference is now made to FIGURES 6 and 7 wherein another program member of this invention is generally indicated by the reference numeral 10A and parts thereof similar to the program member 10 previously described are indicated by like reference numerals followed by the reference letter A.

As illustrated in FIGURES 6 and 7, the rigid back-up means 12A is substantially identical to the back-up means 12 previously described except that the projection 20A has the aperture means 22A passing therethrough in such a manner that the aperture means 22A does not define the previously described flange means 23. Instead, the projection means 20A is provided with a cylindrical bore portion 35 passing uniformly therethrough and aligned with the aperture means 33A passing through the reading sheet 11A.

Also, the reading sheet 11A is not provided with the blister members 29 and 30 previously described whereby the peripheral edge means 36 of flat under surface 16A thereof surrounding the aperture 33A passing therethrough is disposed directly on the flat end surface 37 of the projection 20A of the rigid back-up means 12A and is ultrasonically welded thereto in substantially the manner previously described when the rigid back-up means 12A is formed of a material that permits the rigid back-up means 12A to be ultrasonically welded to the particular material forming the reading sheet 11A.

Therefore, it can be seen that the program member 10A of this invention is adapted to function in the same manner as the program member 10 previously described because the reading sheet 11A is directly secured to the rigid back-up means 12A at the cooperating surface means 36 and 37 thereof so that movement of either the reading sheet 11A or rigid back-up means 12A causes the members 11A and 12A to move in unison for the purpose previously described.

Therefore, it can be seen that this invention not only provides an improved program member having improved means for causing the flexible reading sheet and rigid back-up means thereof to move in unison, but also this invention provides improved methods of making such a program member or the like.

While the form of the invention now preferred has been disclosed as required by the statutes, other forms may be used, all coming within the scope of the claims which follow.

What is claimed is:

1. A program member or the like comprising a rigid back-up means, and a flexible reading sheet having a portion thereof disposed against a portion of said back-up means, said portions of said back-up means and said reading sheet being ultrasonically welded together whereby said back-up means and said reading sheet move in unison when either one is moved, said portion of said back-up means has an aperture passing therethrough and defining an annular flange means of said back-up means that projects radially into said aperture, said flange means having a plurality of slot means passing therethrough, said portion of said back-up means including a washer-like element disposed against one side of said flange means and having parts thereof exposed at said slot means thereof, said portion of said reading sheet including a plurality of projecting blister-like members disposed within said slot means and being ultrasonically welded to said exposed parts of said washer-like element whereby said reading sheet is held to the other side of said flange means by said washer-like element and has said projecting blister-like members disposed in splined relation with said slot means to cause said reading sheet and back-up means to move in unison.

2. A program member or the like comprising a rigid back-up means, and a flexible reading sheet having a portion thereof disposed against a portion of said back-up means, said portions of said back-up means and said reading sheet being secured together whereby said back-up means and said reading sheet move in unison when either one is moved, said portion of said back-up means having an aperture passing therethrough and defining an annular flange means of said back-up means that projects radially into said aperture, said flange means having a plurality of slot means passing therethrough, said portion of said back-up means including a washer-like element disposed against one side of said flange means and having parts thereof exposed at said slot means thereof, said portion of said reading sheet including a plurality of projecting blister-like members disposed within said slot means and being secured to said exposed parts of said washer-like element whereby said reading sheet is held to the other side of said flange means by said washer-like element and has said projecting blister-like members disposed in splined relation with said slot means to cause said reading sheet and back-up means to move in unison.

3. A method for making a program member or the like, comprising the steps of providing a rigid back-up means, providing a flexible reading sheet, disposing a portion of said flexible reading sheet against a portion of said back-up means, and ultrasonically welding together said portions of said back-up means and said reading sheet whereby said back-up means and said reading sheet will move in unison when either one is moved, forming a shoulder means or said portion of said back-up means, forming an opening means through said shoulder means, disposing a separate element against said shoulder means so that the same is exposed at said opening means, and disposing said portion of said reading sheet against said exposed portion of said element at said opening means whereby said ultrasonic welding step secures said portion of said reading sheet to said element at said opening means so that said shoulder means is held between said reading sheet and said element to interconnect said reading sheet and said back-up means together.

4. A method as set forth in claim 3 and including the step of disposing said portion of said reading sheet into said opening means of said back-up means to mechanically interlock said reading sheet and said back-up means together.

5. A method for making a program member or the like, comprising the steps of providing a rigid back-up means, providing a flexible reading sheet, disposing a portion of said flexible reading sheet against a portion of said back-up means, and ultrasonically welding together said portions of said back-up means and said reading sheet whereby said back-up means and said reading sheet will move in unison when either one is moved, forming an aperture through said portion of said back-up means to define an annular flange means of said back-up means which projects radially into said aperture, forming a plurality of slot means through said flange means, disposing a washer-like element against one side of said flange means to have parts thereof exposed at said slot means, forming a plurality of projecting blister-like members on said portions of said reading sheet, and disposing said blister-like member within said slot means so that said blister-like members will be secured to said exposed parts of said washer-like element by said ultrasonic welding step whereby said reading sheet is held to the other side of said flange means by said washer-like element and has said projecting blister-like members disposed in splined relation within said slot means to cause said reading sheet and back-up means to move in unison.

6. A method for making a program member or the like comprising the steps of providing a rigid back-up means, providing a flexible reading sheet, forming an aperture through a portion of said back-up means to define an annular flange means of said back-up means that projects radially into said aperture, forming a plurality of slot means through said flange means, disposing a washer-like element against one side of said flange means so as to have parts thereof exposed at said slot means thereof, forming a plurality of projecting blister-like members on a portion of said reading sheet, disposing said blister-like members within said slot means, and securing said blister-like members to said exposed parts of said washer-like element whereby the reading sheet is held against the other side of said flange means by said washer-like element and has said projecting blister-like members disposed in splined relation with said slot means to cause said reading sheet and back-up means to move in unison.

References Cited

UNITED STATES PATENTS

| | | | |
|---|---|---|---|
| 3,047,942 | 8/1962 | Schneider | 228—10 X |
| 3,237,529 | 3/1966 | Beck et al. | 137—624.18 X |
| 3,255,672 | 6/1966 | Wantz et al. | 137—625.21 X |
| 3,286,730 | 11/1966 | Beck et al. | 137—624.18 X |

ALAN COHAN, *Primary Examiner.*

U.S. Cl. X.R.

29—157.1